United States Patent
Liu et al.

(10) Patent No.: US 7,802,981 B2
(45) Date of Patent: Sep. 28, 2010

(54) DEVICE FOR EXTRACTING A MOLD CORE FROM A MOLD ASSEMBLY, AND MOLD ASSEMBLY USING THE DEVICE

(75) Inventors: Zg Liu, Sz-Chuan Province (CN); Victor Lee, Shan-Shi Province (CN)

(73) Assignees: Delta Electronics Components (Dongguan) Co., Ltd., Kuang-Dong Province (CN); Delta Electronics, Inc, Taoyuan Hsien (TW)

( * ) Notice: Subject to any disclaimer, the term of this patent is extended or adjusted under 35 U.S.C. 154(b) by 232 days.

(21) Appl. No.: 11/752,953

(22) Filed: May 24, 2007

(65) Prior Publication Data

US 2008/0089965 A1    Apr. 17, 2008

(30) Foreign Application Priority Data

Oct. 12, 2006    (TW) .............................. 95137568 A

(51) Int. Cl.
*B29C 45/44*    (2006.01)
(52) U.S. Cl. .................... 425/468; 249/64; 249/176; 425/438; 425/577
(58) Field of Classification Search ................ 425/116, 425/190, 330, 441, 468, 577, 438, 451.3, 425/289, 306, 307; 74/25, 29, 89.17; 249/64, 249/176
See application file for complete search history.

(56) References Cited

U.S. PATENT DOCUMENTS

| | | | | |
|---|---|---|---|---|
| 4,210,196 A | * | 7/1980 | Weiner | 164/152 |
| 4,362,687 A | * | 12/1982 | Olschewski et al. | 264/318 |
| 5,114,657 A | * | 5/1992 | Miyajima | 264/334 |
| 5,776,521 A | * | 7/1998 | Wright et al. | 425/556 |
| 6,655,952 B1 | * | 12/2003 | Kraft | 425/556 |
| 6,659,761 B2 | * | 12/2003 | Persson | 425/577 |
| 6,663,347 B2 | * | 12/2003 | Decker et al. | 416/185 |
| 6,892,630 B1 | * | 5/2005 | Huang | 99/450.1 |
| 6,904,949 B2 | * | 6/2005 | Decker et al. | 164/35 |
| 2004/0207108 A1 | * | 10/2004 | Pacchiana et al. | 264/109 |
| 2008/0134812 A1 | * | 6/2008 | Murata | 74/25 |

FOREIGN PATENT DOCUMENTS

EP    0476392 A1 *    3/1992
EP    0808702     *    11/1997

* cited by examiner

*Primary Examiner*—Yogendra N Gupta
*Assistant Examiner*—Emmanuel S Luk
(74) *Attorney, Agent, or Firm*—Connolly Bove Lodge & Hutz LLP

(57) ABSTRACT

A device for extracting the mold core and a mold assembly using the same are disclosed. The extracting device comprises a first gear, a plurality of first racks and a plurality of transmission assemblies, wherein the transmission assemblies and the corresponding first racks are spaced apart along the periphery of the first gear such that each transmission assembly is located between the first gear and first racks. The rotating motion of the first gear is transformed into a reciprocating motion of each of the first racks from a first position to a second position.

8 Claims, 3 Drawing Sheets

US 7,802,981 B2

DEVICE FOR EXTRACTING A MOLD CORE FROM A MOLD ASSEMBLY, AND MOLD ASSEMBLY USING THE DEVICE

This application claims priority to Taiwan Patent Application No. 095137568 filed on Oct. 12, 2006; the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to production equipment and fixtures; specifically, it relates to a mold assembly to manufacture an object with a hole, and a device for extracting a mold core from the mold assembly.

2. Descriptions of the Related Art

While manufacturing one-piece plastic parts using current technology, such as the blade parts with multiple inward holes (as the part 110 shown in FIG. 1) of a fan frame, a plurality of mold cores used for extraction have to be disposed in the mold assembly to completely strip the mold of inward concaves and form holes or wind tunnels in the blade accordingly. In view of current mold core extraction structures, an appended mold core extraction hydraulic pump corresponding to each of the holes is disposed in the mold assembly. As shown in FIG. 4, a plurality of mold core extraction hydraulic pumps 101, 102, 103, 104, 105, 106, 107, 108, and 109 are disposed correspondingly to each mold core extraction shaft on the mold base. After raw materials for plastic products have been injected into the mold, the mold core can be extracted out of the mold using the hydraulic pump to form the product with holes or tunnels therein, such as the product with nine wind tunnels shown in FIG. 1.

However, the aforementioned production and manufacturing methods have drawbacks, such as complicated mold assembly structures, large profiles, imprecise assembly for mold core extraction, and heavy weights needed for the injection molding machines. As a result, these drawbacks are not economically efficient.

In view of these drawbacks, the aforementioned mold assembly and mold device for extracting the mold core have to be redesigned to satisfy the following requirements: small volume, space-saver, easy maintenance and high precision.

SUMMARY OF THE INVENTION

One objective of this invention is to provide a mold device for extracting a mold core that has been installed and used in the mold assembly. The mold device is small in volume, saves space and has a low manufacturing cost. Furthermore, since the mold device is driven by the same gear structure, the power for extracting the mold core is uniform and sufficient enough for significantly increasing the quality of products.

Another objective of this invention is to provide a mold assembly adopting this device for extracting a mold core.

The invention provides the following technology scheme. The device for extracting the mold core comprises a first gear, a plurality of first racks, and a plurality of transmission assemblies. The transmission assemblies are spaced apart from each other along the periphery of the first gear, and disposed between the periphery of the first gear and the first racks, respectively, so as to transform the rotating motion of the first gear into the reciprocating motion of each of the first racks from a first position to a second position.

Moreover, the mold assembly provided in the invention comprises a base with a plurality of receiving spaces and a plurality of slots, wherein each of the receiving spaces is associated with the slots and is disposed on the base and spaced apart from each other. The mold assembly further comprises a device for extracting the mold core, wherein each of the first racks and each of the third gears are placed in each of the slots and receiving spaces respectively.

The invention has the following advantages. The driving rack is used to rotate the first gear for driving the corresponding small gears to further drive the plurality of the first racks to complete the mold core extraction and reciprocating motion. Because the number of mold core extraction hydraulic pumps can be reduced significantly, the volume of the injection mold assembly can be reduced and thus, save costs. Furthermore, the mold assembly used for mold core extraction can be installed on a small injection machine, widening its applications.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
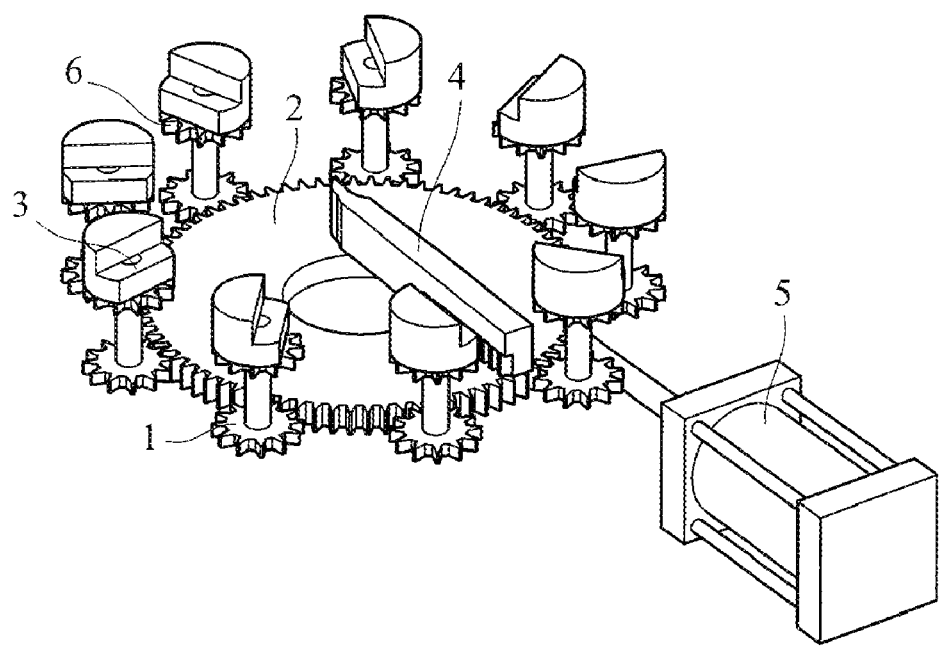
FIG. 2 is a structural schematic diagram of a device that extracts the mold core of the mold assembly presented in this invention.

FIG. 2 illustrates a mold assembly and a device in the mold assembly for extracting a mold core. The device comprises a first gear 2, a plurality of first racks 4 and a plurality of transmission assemblies, wherein the plurality of transmission assemblies are spaced apart from each other along the periphery of the first gear 2. Each transmission assembly engages between the first gear 2 and each of the first racks 4 to transform the rotating motion of the first gear 2 to the reciprocating motion of each of the first racks 4 so that the first racks 4 can move from the first position to the second position to help the first racks in the mold core extraction.

Preferably, the transmission assembly comprises a second gear 1, a vertical extension shaft and a third gear 6. The second gear 1 is disposed on the periphery of the first gear 2 and engages with the first gear 2. The vertical extension shaft has a first end and a second end opposite to the first end, wherein the first end connects to the second gear 1. Furthermore, the third gear 6 is disposed on the second end of the vertical extension shaft and engages with each of the first racks 4.

Moreover, the device used for mold core extraction further comprises a second rack (not shown) and a driving apparatus 5 that engages with the first gear 2 to perform corresponding actions between the first gear 2 and the driving apparatus 5. That is, when the second rack moves back and forth in response to the driving apparatus 5, the second rack can either directly or indirectly drive the first gear 2 to rotate and drive the plurality of second gears 1 to simultaneously rotate. When this occurs, the corresponding plurality of third gears 6 connected to the second gears 1 also simultaneously rotate, driving the engaged first racks 4 to perform a reciprocating motion between the first position and the second position.

In a preferred embodiment, the driving apparatus 5 that is adapted to drive the second rack can be, but not limited to, a hydraulic pump, an electric motor or a pneumatic pump.

Figure 3:
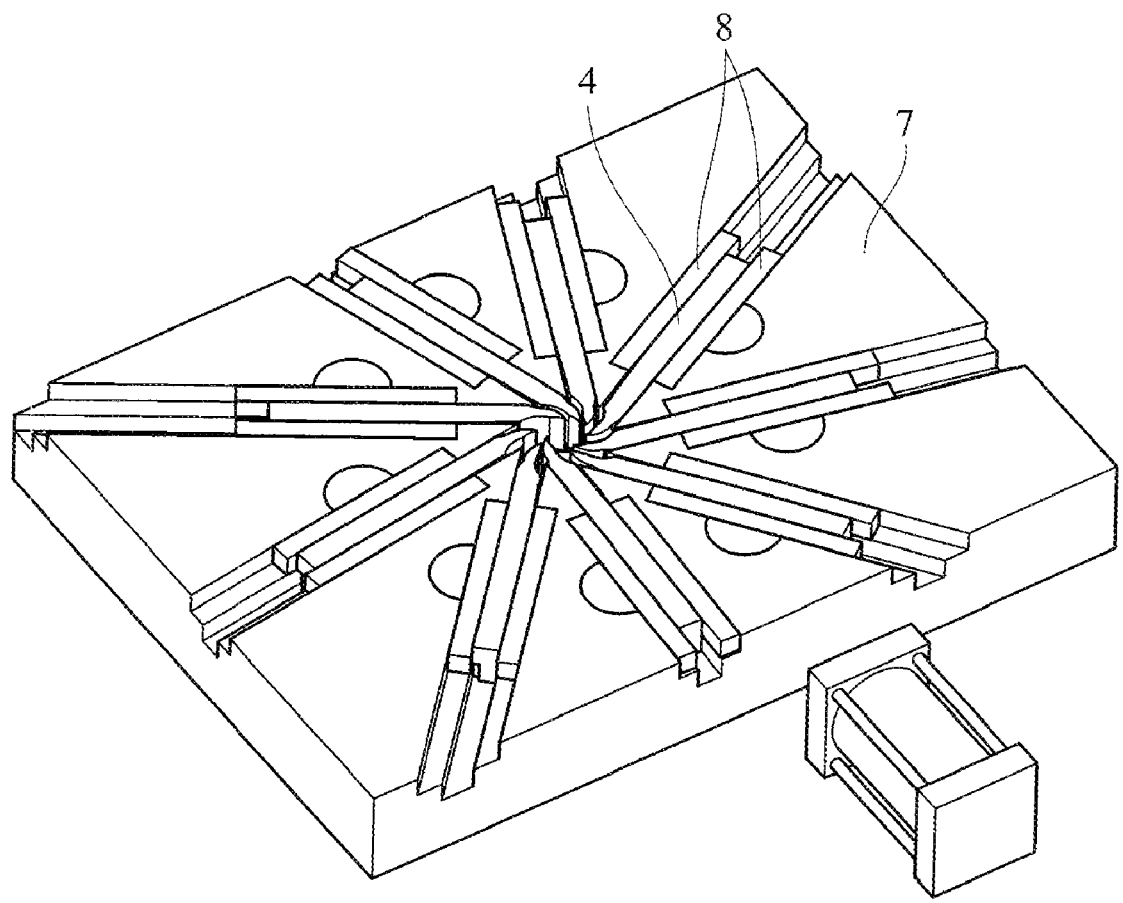
FIG. 3 is a structural schematic diagram of the mold assembly of the invention.
Figure 4:
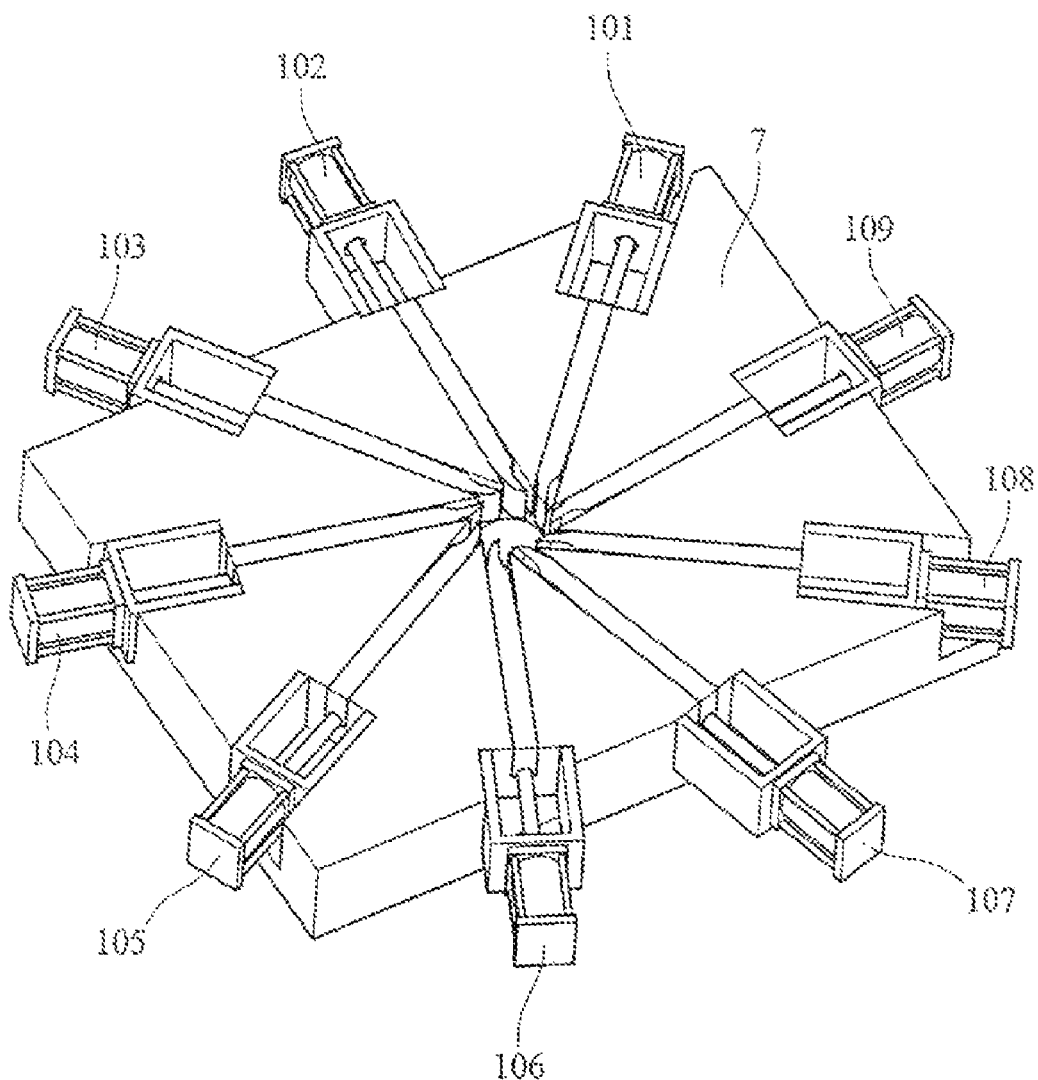
FIG. 4 is a structural schematic diagram of a prior art device for extracting a mold core and a corresponding mold assembly.

FIG. 3 shows an embodiment of a mold assembly of the aforementioned device for extracting the mold core of the invention. The mold assembly comprises a base 7 and the device for extracting the mold core, wherein the base 7 comprises a plurality of receiving spaces and slots. Each receiving space is disposed on the base 7 and spaced apart from each other according to the slots, while each of the first racks 4 and third gears 6 are placed in each of the slots and receiving space, respectively. In the embodiment shown in FIG. 3, there are nine mold core extraction slots disposed on the base 7 for extracting the mold core. Furthermore, the first gear 2 is disposed on the lower side of the base center 7, while the driving apparatus 5, adapted to drive the second rack, is disposed on the outer side of the base 7 and the first gear 2.

Figure 1:
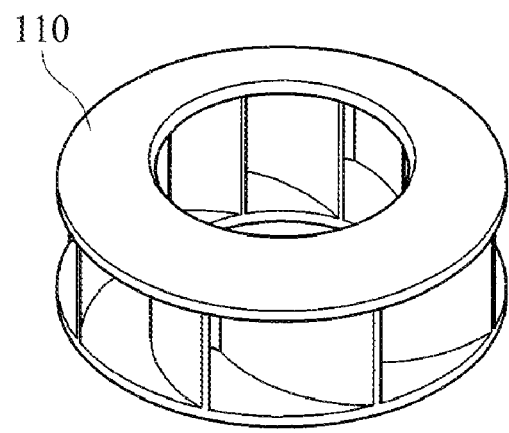
FIG. 1 is a schematic diagram of a product structure intended for injection molding.

In another embodiment, the mold assembly further comprises a plurality of embedded strips 8 and sleeves 3 for easily maintaining the mold assembly, wherein the embedded strips are disposed on the two opposite sides defining the slot, yet detachable from the respective slot thereof. The sleeves 3 are disposed on the receiving spaces respectively so as to rotate the third gears 6, yet are also detachable from the receiving space thereof. Since the embedded strips 8 and the sleeves 3 are all detachable, it is easy cost-efficient to replace worn strips and sleeves with new ones. The working principle of the mold assembly in FIG. 1 for extracting the mold core is the same as the above mention and thus is omitted herein.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mold assembly, comprising:
   a base, having a plurality of receiving spaces and a plurality of slots, wherein the receiving spaces being associated with the slots are disposed on the base and spaced apart from each other;
   a device for extracting a mold core comprising;
   a first gear;
   a driving apparatus driving the first gear to rotate;
   a plurality of first racks; and
   a plurality of transmission assemblies, which are spaced apart from each other along a periphery of the first gear, and disposed between the periphery of the first gear and the first racks, respectively, so as to transform a rotating motion of the first gear to a reciprocating motion of each of the first racks from a first position to a second position, each of the transmission assemblies comprising:
      a vertical extension shaft, having a first end and a second end opposite to the first end, the first end connecting to the second gear; and
      a third gear, disposed on the second end of the vertical extension shaft, the third gear engaging one of the first racks
   wherein each of the first racks and each of the third gears are received in each of the slots and each of the receiving spaces, respectively;
   a plurality of embedded strips, disposed on two opposite sides defining the slot, and each of the embedded strips is detachable from the respective slot thereof: and
   a plurality of sleeves, disposed on the receiving spaces respectively, and each of the sleeves is detachable from the respective space thereof.

2. The mold assembly of claim 1, wherein the first gear is disposed on a lower side of a central portion of the base of the mold assembly.

3. The mold assembly of claim 1, further comprising a second rack engaging and actuating the first gear.

4. The mold assembly of claim 3, wherein the driving apparatus is adapted to drive the second rack for a reciprocating motion.

5. The mold assembly of claim 4, wherein the driving apparatus is a hydraulic pump.

6. The mold assembly of claim 4, wherein the driving apparatus is a pneumatic pump.

7. The mold assembly of claim 4, wherein the driving apparatus is an electric motor.

8. The mold assembly of claim 4, wherein the driving apparatus is disposed on an outer side of the first gear.

* * * * *